United States Patent
Hobson et al.

(10) Patent No.: US 10,340,712 B2
(45) Date of Patent: Jul. 2, 2019

(54) SECURE DEVICE CHARGING

(71) Applicant: CHARGEBOX LTD, London (GB)

(72) Inventors: Ian Timothy Hobson, London (GB); Jonathan John Cheese, Guildford (GB); Jonathan Anthony Hogg, London (GB)

(73) Assignee: CHARGEBOX LTD, London (GB)

( * ) Notice: Subject to any disclaimer, the term of this patent is extended or adjusted under 35 U.S.C. 154(b) by 74 days.

(21) Appl. No.: 14/184,215

(22) Filed: Feb. 19, 2014

(65) Prior Publication Data
US 2014/0239883 A1    Aug. 28, 2014

(30) Foreign Application Priority Data
Feb. 22, 2013  (GB) .................................... 1303163.8

(51) Int. Cl.
*H02J 7/00* (2006.01)

(52) U.S. Cl.
CPC .......... *H02J 7/0052* (2013.01); *H02J 7/0027* (2013.01); *H02J 7/0044* (2013.01); *H02J 7/0004* (2013.01); *H02J 2007/0001* (2013.01); *H02J 2007/0062* (2013.01); *H02J 2007/0096* (2013.01)

(58) Field of Classification Search
CPC ...... H02J 7/0052; H02J 7/0027; H02J 7/0044; H02J 2007/0062; H02J 7/0004; H02J 2007/0001; H02J 2007/0096; Y02T 90/128; Y02T 90/12
USPC ......................................................... 320/107
See application file for complete search history.

(56) References Cited

U.S. PATENT DOCUMENTS

| 792,594 A | 6/1905 | Hiss, Jr. | |
|---|---|---|---|
| 4,829,225 A * | 5/1989 | Podrazhansky | H01M 10/44 320/129 |
| 5,744,933 A | 4/1998 | Inoue et al. | |
| 7,885,893 B2 * | 2/2011 | Alexander | G06Q 20/102 705/40 |
| 2003/0141840 A1 | 7/2003 | Sanders | |
| 2006/0287763 A1 * | 12/2006 | Ochi | G06Q 40/00 700/231 |
| 2009/0014460 A1 | 1/2009 | Kobus, II et al. | |
| 2010/0010698 A1 * | 1/2010 | Iwashita | B60L 3/12 701/22 |
| 2011/0239116 A1 | 9/2011 | Turner et al. | |

(Continued)

FOREIGN PATENT DOCUMENTS

| EP | 2101390 A2 | 9/2009 |
|---|---|---|
| GB | 2410845 A | 8/2005 |

(Continued)

OTHER PUBLICATIONS

International Search Report and Written Opinion; dated Sep. 19, 2014 for related PCT Application No. PCT/EP2014/052281.

(Continued)

*Primary Examiner* — Jack Chiang
*Assistant Examiner* — Brandon Bowers
(74) *Attorney, Agent, or Firm* — Mendelsohn Dunleavy, P.C.

(57) ABSTRACT

One embodiment of the invention is an apparatus for determining the initiation of a charging process for a secure charging apparatus. The apparatus has circuitry for authorising a user, circuitry for confirming connection of a device, and circuitry for confirming charging of the device.

19 Claims, 14 Drawing Sheets

(56) References Cited

U.S. PATENT DOCUMENTS

| | | |
|---|---|---|
| 2012/0129577 A1 | 3/2012 | Vaknin et al. |
| 2013/0030991 A1* | 1/2013 | Neidlinger ............ G07F 15/006 |
| | | 705/39 |
| 2014/0046707 A1 | 2/2014 | Hama |

FOREIGN PATENT DOCUMENTS

| | | | |
|---|---|---|---|
| GB | 2446013 A | 7/2008 | |
| WO | WO 2011014142 A1 * | 2/2011 | ............ H02J 7/0027 |
| WO | WO2012140826 A1 | 10/2012 | |

OTHER PUBLICATIONS

Great Britain Search Report; dated Aug. 8, 2014 for related GB Application No. 1303163.8.
GB Search Report; Dated Aug. 12, 2015 for corresponding GB Application No. GB1303183.8.

* cited by examiner

SECURE DEVICE CHARGING

FIELD OF THE INVENTION

The invention is concerned with the provision of a secure means for charging an electronic device, and particularly but not exclusively for charging a portable electronic device such as a mobile telephone.

BACKGROUND

Mobile electronic devices are increasingly provided which users carry with them. A mobile telephony device is a typical mobile electronic device, but users may also carry dedicated music players and gaming consoles with them for example.

When a user carries a mobile electronic device with them they expect to be able to use it as they wish, and the mobile nature of such devices is that they are intended to be used when a user wishes. The use of mobile electronic devices needs to be independent of access to any independent wired power supply to allow a user to go about their normal business.

Users may however carry with them devices which need to be charged for them to be used or continue to be used. The need to charge mobile electronic devices may be because a battery supply of a device drains in use, rather than because the device is uncharged.

With the rising dominance of smart phones and feature-rich battery-draining demands, maintaining sufficient charge is a constant challenge every day.

Being unable to recharge a device such as a mobile telephone and losing the ability to communicate can cause considerable inconvenience. Research shows that users feel increasingly vulnerable without their mobile telephone, and users expect round-the-clock entertainment from their iPods and games consoles.

A user may access a wired power supply to provide charging of their device, but this typically requires a user to stay with the device when it is charging. Typically a mobile electronic device has a high value associated with it, and a user would thus need to stay with the device when it is charging.

In certain situations a user may wish to allow their mobile electronic device to charge whilst they continue with other things. For example, a user may wish to continue shopping whilst their mobile electronic device charges.

SUMMARY

It is an aim of certain embodiments of the invention to provide a secure charging environment for a mobile electronic device, such as may be provided in a public area.

The aim of such embodiments is to make mobile device charging a routine expectation for the public, so that everyone can stay connected and entertained.

In one embodiment, the invention provides an apparatus for determining the initiation of a charging process for a secure charging apparatus, the apparatus adapted to comprise a means for authorising a user; a means for confirming connection of a device; and a means for confirming charging of the device.

The means for authorising the user may comprise means for identifying the user. The means for identifying the user may further comprise means for comparing the user to a list of authorised users. The means for authorising a user may comprise a means for determining payment by a user. The means for authorising a user may comprise means for providing a confirmation of a user authorisation.

The means for confirming connection of a device may comprise means for detecting connection of a device to a charging cable. The means for detecting connection of a device may comprise means for retrieving an identification of the device on the charging cable.

The means for confirming charging of the device may comprise means for determining that a connected device is being charged for a given accumulated total current delivered over time up to a time limit.

The apparatus may further comprise means for enabling a locking mechanism responsive to means for determining the initiation process.

The secure charging apparatus may comprise a plurality of secure charging positions, wherein the means for enabling a locking mechanism is enabled for the secure charging position for which the connection of the device and the charging of the device are confirmed.

The apparatus may further comprise means for the user to select the secure charging position before the initiation process.

A corresponding method is also disclosed, which comprises a method for determining the initiation of a charging process for a secure charging apparatus, comprising for authorising a user; confirming connection of a device; and confirming charging of the device.

In another embodiment, the invention provides a locking mechanism for a secure charging apparatus comprising a moveable actuator wherein in a first position of the actuator the lock is open and in a second position of the actuator the lock is closed, the locking mechanism further including an electronic detector wherein with the actuator in the first position the electronic device is in a first state and with the actuator in the second position the electronic detector is in a second state, the state of the electronic device being transmitted to a means for determining the state of the lock.

A corresponding method may be provided, which comprises a method for a locking mechanism for a secure charging apparatus comprising a moveable actuator wherein the method comprises opening a lock in a first position of the actuator and closing a lock in a second position of the actuator, the method further comprising an electronic detection step wherein with the actuator in the first position the electronic device is in a first state and with the actuator in the second position the electronic detector is in a second state, further comprising transmitting the state of the electronic device to an electronic controller or computer for determining the state of the lock.

The actuator may be a circular member. The first and second positions may be 90° apart.

The locking mechanism may comprise a protrusion attached to the circular member, wherein in the first position the protrusion does not activate an electronic detector and in the second position the protrusion does activate an electronic detector.

The actuator may comprise an opening and a sliding section, wherein in the first position the opening engages the electronic device and in the second position the electronic device rests against the sliding section.

In yet another embodiment, the invention provides a mechanical connector for providing a cable for a secure charging apparatus wherein the mechanical connector has a cable traversing such and is resistant to movement of the cable in a lateral direction and is non-resistant to movement of the cable in a direction perpendicular to the lateral direction.

A plurality of cables may transverse such. The plurality of cables may correspond to the number of charging cables provided in a secure locker of the secure charging apparatus.

The cable may comprise a charging cable having a connector disposed in a secure locker of the secure charging apparatus.

The cable may be further connected to a mechanical connector which positions the cable for connection to the mechanical connector.

The orientation of the cable may be maintained.

There is also provided a method which comprises a method for a mechanical connector for providing a cable for a secure charging apparatus wherein the method comprises a cable traversing such and further provides a resistance to movement of the cable in a lateral direction and is non-resistant to movement of the cable in a direction perpendicular to the lateral direction.

Any method described may be implemented in software. A computer program product may be provided on which is stored or carried computer program code for implementing any described method.

BRIEF DESCRIPTION OF THE DRAWINGS

Embodiments of the invention are now described by way of example with reference to the accompanying Figures in which.

DETAILED DESCRIPTION

The invention is now further described in detail by way of reference to particular embodiments and to its application in particular implementations. One skilled in the art will appreciate that the invention is not limited to aspects of such embodiments or implementations.

The description relates to a process and apparatus for charging an electronic device. An example of an electronic device which may be charged by this process and apparatus is a mobile telephone. It will be apparent that the described process and apparatus may apply to other electronic devices.

The description is particularly concerned with a secure process and apparatus for charging electronic devices. Such a mechanism may be used, for example, for a user to charge their electronic device in a public environment without attending to it.

In the described arrangement an apparatus may be provided which has secure access for a plurality of electronic devices to be charged. A user may securely access a part of the apparatus to charge an electronic device without needing to attend it.

In a particular arrangement an apparatus may comprise a charging station having a plurality of secure areas. Each secure area may be a locker having a lock. With each secure area there may be provided means for connecting an electronic device for charging. The means may be a cable with a charging connector for the device.

Each secure area may have a plurality of cables with different charging connectors, such that each secure area is provided with a means to charge a plurality of different electronic devices.

In use, in general, a user accesses a secure area and connects their electronic device to an appropriate charging connector of a cable. The user then locks the secure area and leaves the electronic device charging. The user accesses the secure area and retrieves the electronic device after an elapsed time.

The access to the secure charging provided by this apparatus is controlled by a preferable process.

An example is described herein of an apparatus comprising a set of secure access areas for charging electronic devices. The set of secure access areas are referred to as lockers of the apparatus. The electronic devices may be mobile telephones. The lockers may be sized and shaped to accommodate the electronic devices they are to secure for charging, and in the present example the lockers are sized to fit a mobile telephone device.

Figure 1:
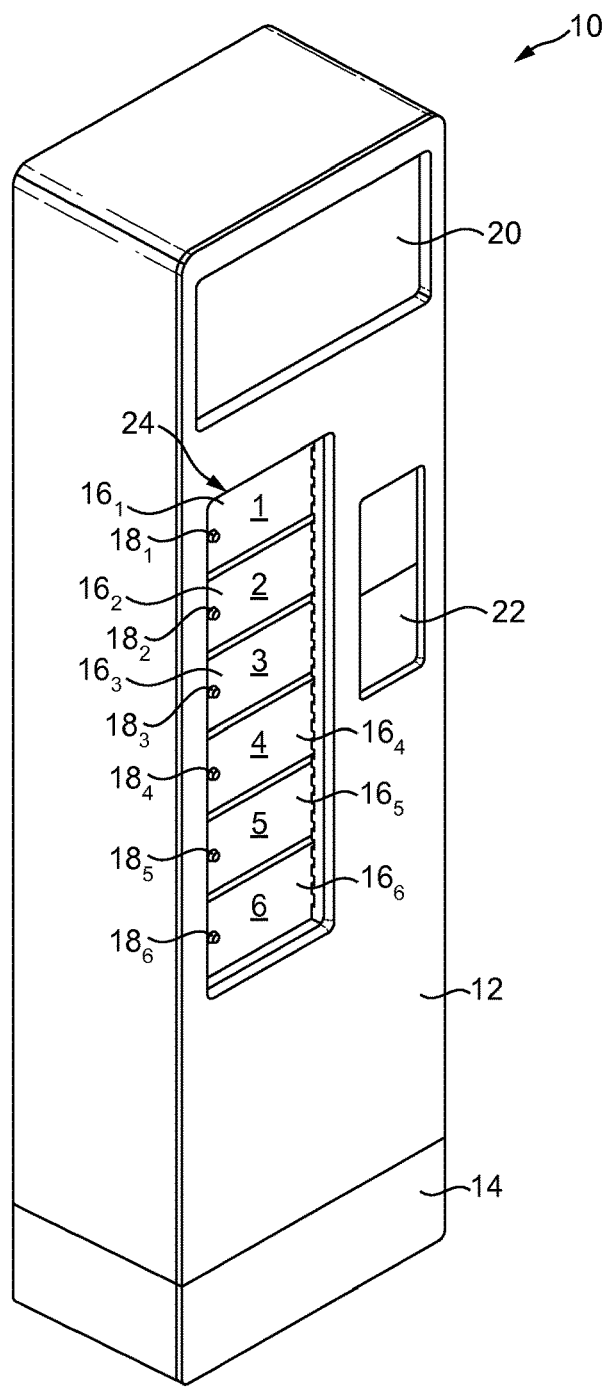
FIG. 1 shows a charging apparatus in accordance with which preferred examples are described.

FIG. 1 illustrates an exemplary apparatus.

The apparatus 10 comprises a main stand 12 having a base 14. The stand 12 is provided to house a set of lockers 24 at a position which is convenient for users. The use of a stand 12 to house the lockers 24 allows the stand to be located in various locations. The stand 12 may include a set of instructions for a user denoted by reference numeral 20, and a user input interface 22.

The user input interface 22 may be used for a user to input money, a credit card, or other tokens for use.

The set of instructions 20 may comprise a screen used to electronically display to the user instructions or information associated with the use of the locker, and for example to select options using touch input (for example with a touch-screen or buttons).

The set of lockers 24 in this example include six lockers denoted by $16_1$ to $16_6$ denoted by locker 1 to 6 for user purposes. Each of the lockers $16_1$ to $16_6$ includes a lock $18_1$ to $18_6$. The lock will be implementation dependent, and may be a mechanical lock or may be an electronic lock.

Each locker $16_1$ to $16_6$ is provided for a user to charge an electronic device. The presence of a lock $18_1$ to $18_6$ means that a user can lock the locker and leave their electronic device to charge unattended. In order to support the charging of the device, each locker includes means to enable such charging.

Figure 2:
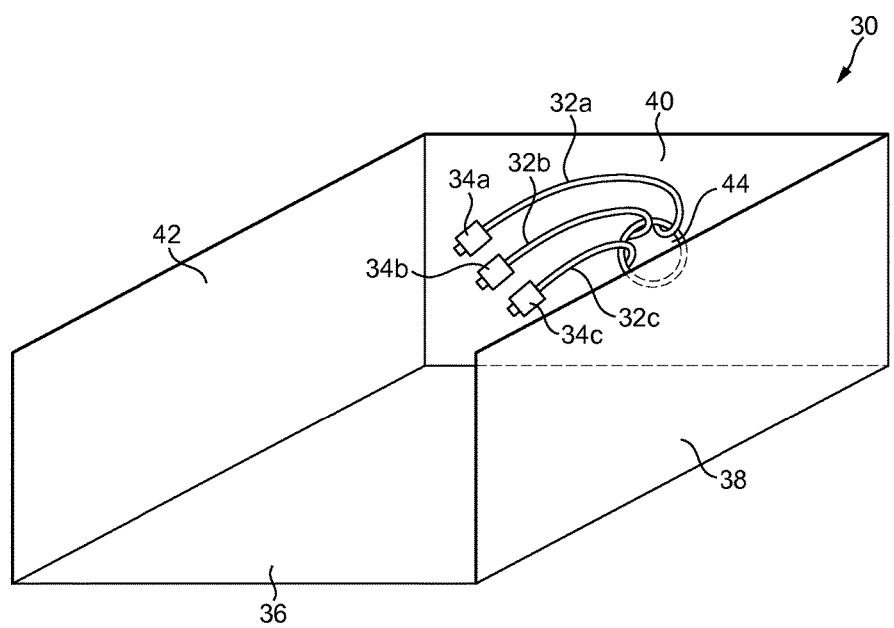
FIG. 2 illustrates a part schematic of a charging locker of a charging box such as that shown in FIG. 1.

With reference to FIG. 2 there is illustrated in simplistic form the implementation of a locker ($16_1$ to $16_6$ of FIG. 1), illustrated by reference numeral 30. In the diagram of FIG. 2 the locker door of the respective locker ($16_1$ to $16_6$ of FIG. 1) is not shown for ease of illustration.

As shown in FIG. 2 each locker 30 has a base layer 36, a rear wall 40 and sidewalls 38 and 42. The locker will also have a top layer (which is not shown in FIG. 2 for ease of reference) which sits on top of the sidewalls. The locker door (which also is not shown in FIG. 2 for ease of reference) will form the front sidewall when closed.

In this example the rear wall 40 is provided with a hole through which protrude electrical cables for providing charging to an electronic device. In the example shown the opening 44 in the rear wall 40 is a circular opening, but other shapes of opening may be provided. In the example illustrated the opening 44 provides for three electrical cables $32_a$ to $32_c$ to protrude therethrough. Each cable $32_a$ to $32_c$ is provided with a connector $34_a$ to $34_c$ for connection to an electronic device. Each of these connectors $34_a$ to $34_c$ will be a different connector to allow for charging to a different electrical socket of an electronic device. The number of electrical cables provided will depend upon the number of electronic devices it is desired to cater for. In the example shown in FIG. 2 the charging lockers are proposed to provide three cables to allow charging to any one of three different types of electrical connector.

In practice, one device is charged in a locker at any one time. However different devices could be connected and charged simultaneously in a locker. If a locker was provided with the more than one charging cable of the same type, then the locker could also provide for charging of devices of the same type simultaneously in the same locker.

Figure 3:
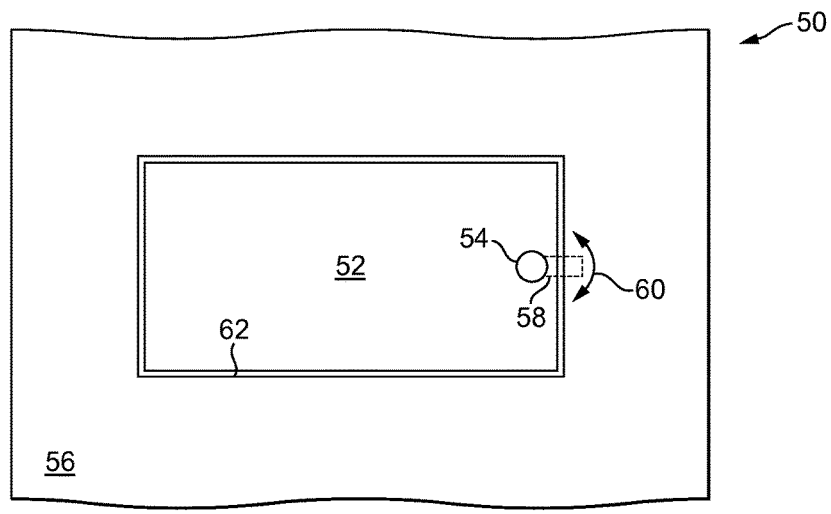
FIG. 3 illustrates a charging locker door and a locking mechanism such as may be used in an example mechanism such as shown in FIG. 1.

The locking mechanism for each individual locker is shown more clearly by reference numeral 50 in FIG. 3. In the arrangement of FIG. 3 there is shown one of the lockers ($16_1$ to $16_6$ of FIG. 1). In this arrangement the locker door 52 is shown having a locking mechanism 54 provided thereon. The locking mechanism 54 will be controlled by the user to lock and unlock the locker. In the example of FIG. 3 the locker door 52 is shown as provided in the face of the apparatus in which the lockers are provided, which is denoted by reference numeral 56. Reference numeral 62 denotes a space in between the locker door 52 and the apparatus 56, which merely denotes that the locker door 52 may be operated and opened independently of the apparatus 56. The apparatus 56 may be the body of the apparatus 10 of FIG. 1.

Also shown in FIG. 3 in dashed outline is a rectangular shape 58, which denotes the locking mechanism for the locker door 52. In one example the locking mechanism 54 may be a key operated means, and by turning the key the rectangular means may be rotated as illustrated by the arrow 60. In a position shown in FIG. 3 the locker door is secured by abutting the rectangular shape 58 against the internal surface of the apparatus 56. By rotating the locking means 54 clockwise or anti-clockwise as illustrated by the arrow 60, the door 52 may be opened since the rectangular means 58 can be moved to no longer abut the internal surface of the apparatus 56. Other locking mechanisms may be provided.

In the arrangement of FIG. 3 the apparatus 56 provides the means for securing the locking mechanism. In an alternative arrangement the locker may provide means for securing the locking mechanism rather than the apparatus 56, preferably providing a housing wall against which the rectangular means can abut.

Figure 4:
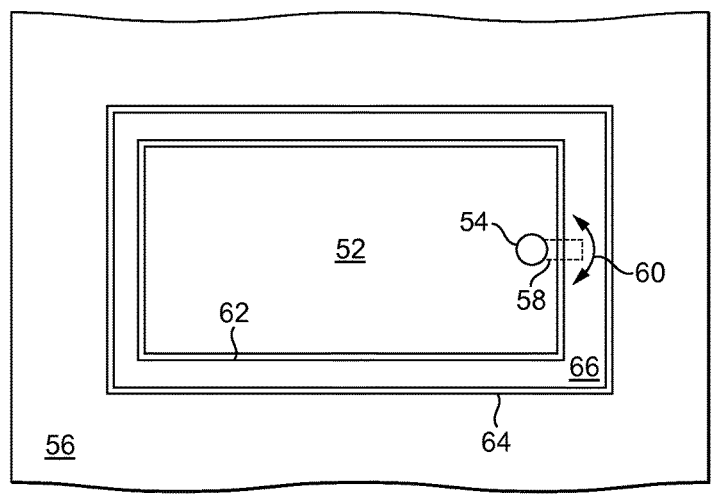
FIG. 4 illustrates an alternative implementation of a charging locker including a charging locker door and a locking mechanism.

With reference to FIG. 4 there is illustrated such an alternative arrangement in which there is additionally provided a physical area 66 in addition to the locker door 52 and the apparatus 56. Reference numeral 64 illustrates that the portion 62 is provided separate to the apparatus 56. In this arrangement the rectangular shape 58 abuts the location 66, rather than the apparatus 56.

The arrangement of FIG. 4 has an advantage over the arrangement of FIG. 3 in that the locker apparatus may be provided by the door 52 and the surrounding area 66 and mounted in the apparatus 56, such that the apparatus 56 is independent of any locker mechanism. In the arrangement of FIG. 3 the apparatus 56 is provided to provide the abutting edge for the locking mechanism. In the arrangement of FIG. 4 the apparatus 66 provides a housing wall (or surface) against which the rectangular means can abut.

It should be noted that in the arrangements of FIGS. 3 and 4 the rectangular shape 58 is shown in dashed form since it would not be visible looking at the front of the apparatus, and will be operated internal to the apparatus.

Such an apparatus may be provided as a floor standing unit or wall mounted unit, or in any configuration suitable to the implementation.

The general purpose of such an application is to allow a user to securely charge their electronic device in a public environment. Such an apparatus may be provided in many different locations, such as public area of a shopping mall, an exhibition area, transport hub, entertainment venue or store, etc. Such an apparatus may also be provided in more restricted locations, such as restricted areas of a shopping mall, an exhibition area, transport hub, entertainment venue or store, etc. Such an apparatus may have applications in any area where it is desired to provide a secure place for charging an electronic device.

An authentication process is preferably provided to control the use of the apparatus by a user. The authentication process advantageously provides a secure technique to enable a user to use the apparatus, and a secure technique for the owner or controller of the apparatus to provide a service to users.

Figure 5:
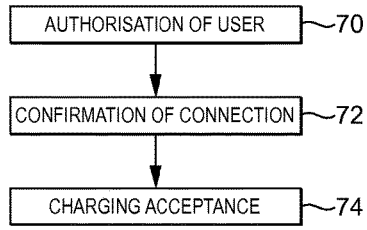
FIG. 5 illustrates a process in accordance with an advantageous authentication technique.

As denoted in FIG. 5 the authentication process preferably comprises three stages:

1. The authorisation of a user in step 70.
2. Confirmation that a device has been connected in step 72.
3. Acceptance of a charging connection in step 74.

The authorisation of a user may be achieved in multiple ways. The authorisation techniques supported by a given implementation will be dependent upon the input devices provided to support the authorisation. Example input devices include input devices to read coupons, camera devices, remote communication devices including radio, optical and audio-based communication, bar code reader devices, card reader devices (e.g. for reading loyalty cards). Such input devices may be provided as part of the input means of the apparatus 12, for example as part of the input interface 22 (of FIG. 1).

In some implementations all users are assumed to be authorised users. This will typically be public applications. In some cases the site owner may want to restrict users. For example, a store may only want users having a store card to have access to a charging device in their store. The use of a charging unit may be tied to something else.

Figure 6:
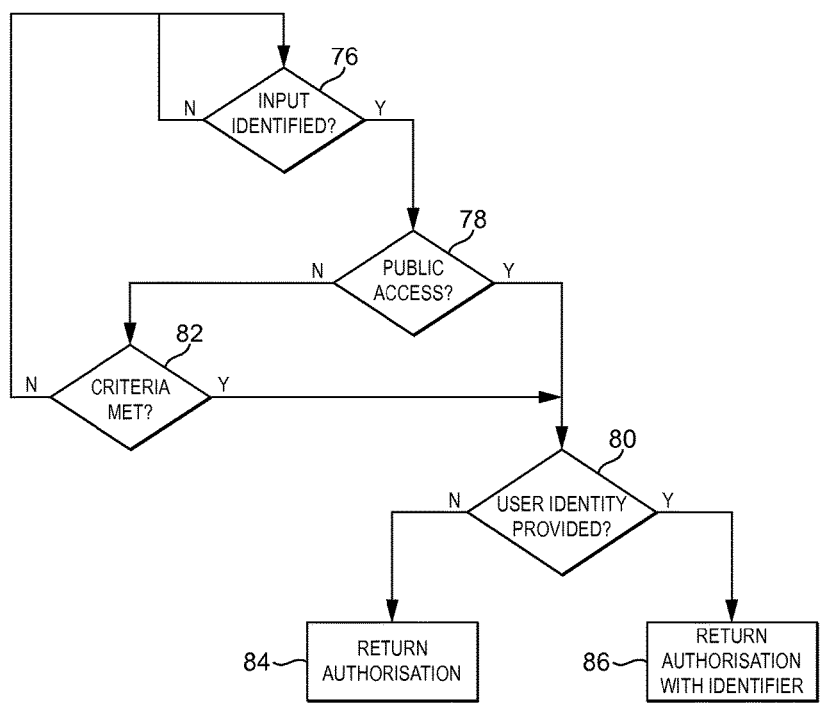
FIG. 6 illustrates an example of an authorisation process for a user.

FIG. 6 illustrates an exemplary process for authorising a user in accordance with step 70 of FIG. 5.

As shown in FIG. 6 in step 76 it is determined whether an input has been identified. If an input has not been identified then the process stays in step 76. If an input has been identified then the process moves on to step 78.

In step 78 it is determined whether the access is public access. If the access associated with a charging operating is public, then in step 80 the process determines whether an identification of the user has been provided. If an identification of the user has been provided then in step 84 the user identification is returned together with an authorisation for the user, and otherwise in step 86 the process simply returns an authorisation for the user.

In step 78 if it is determined that access is not public, then in step 82 it is determined whether the relevant criteria is met. If the relevant criteria is met then the method proceeds to step 80. If the relevant criteria is not met then the process returns to step 76 to look for identification of an input.

It should be noted that authorisation may include the criteria that a user provides an appropriate payment, which may be required as authorisation even if authorisation is otherwise public.

FIG. 6 sets out an exemplary process for user authorisation. Various mechanisms may be used for achieving user authorisation. One example mechanism, described further hereinbefore, may be partly or fully automated and utilise short range wireless communication between the apparatus (i.e. the charging apparatus) and the device (i.e. mobile device) of the user.

A mobile device may have an app installed associated with the charging process. 'Apps' are well-known in the art. An 'app' is an application, typically a small, specialized program downloaded onto a mobile device.

A mobile device may have an app installed which is related to the service provided by the charging apparatus. For example, where the charging apparatus is a Chargebox® device, a mobile device may have a Chargebox® app installed. Alternatively, a mobile device may have an app installed which is associated with a retailer or other entity, with the charging apparatus being provided and/or operated by that retailer or other entity.

In all cases, the app is able to communicate with software associated with the charging apparatus itself, which might be an app associated with the charging device or other software associated with the charging device, without user interaction. Where the app on the mobile handset is an app of a retailer or other entity, there may be provided a separate communication between software of the charging apparatus and software of the retailer or other entity, to provide charging apparatus functionality through the retailer or other entity app. For simplicity of explanation, it will be assumed herein that an app installed on the mobile device can communicate directly with an app or software of the charging apparatus.

The communication between the mobile device app and the charging apparatus software may take advantage of Bluetooth® beacon networks, or other short range communications technology for which the mobile device is adapted to operate. The following describes an implementation assuming the use of Bluetooth® communication, but it will be understood that any wireless communication, probably short range radio communication but also potentially optical or audio frequency, may be utilised between the mobile device and the charging apparatus.

The charging apparatus is equipped with software to control the transmission of a so-called beacon signal, which broadcasts messages to mobile devices. Specifically messages are transmitted to apps associated with the charging apparatus and installed on mobile devices. Using short range communications, the message may be received by a mobile device when it is within a certain distance of the charging apparatus. Where an app is an app of a retailer or another entity, the message may be received by an app of a mobile device when the mobile device is within the retailer's store, within a certain proximity of the store, or within a certain area within the store.

Figure 7:
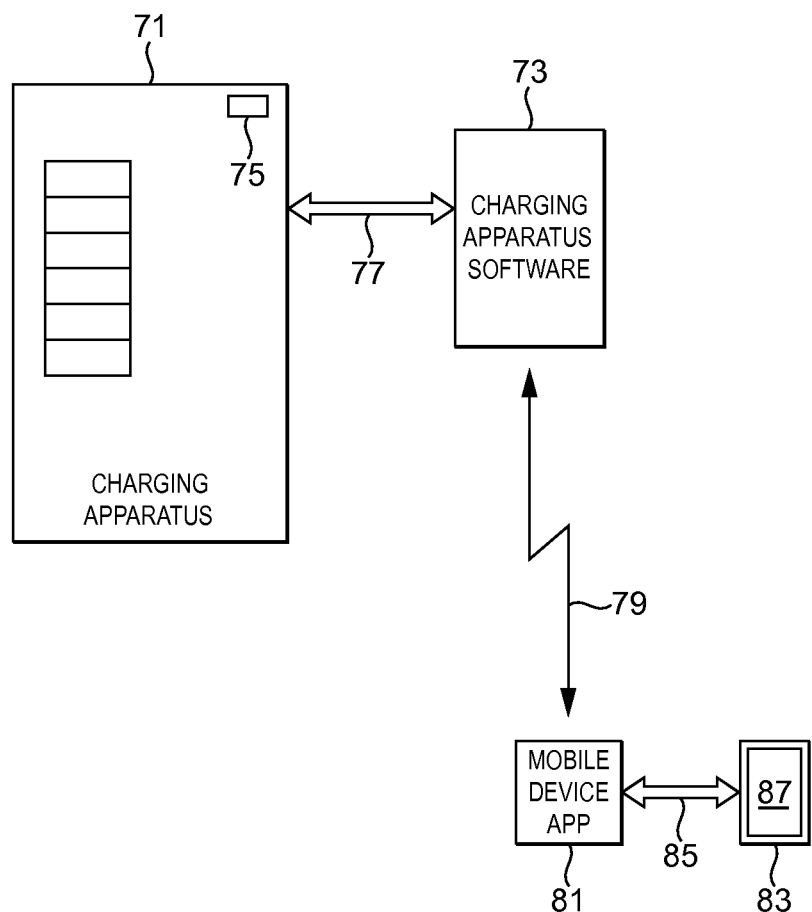
FIG. 7 illustrates an example implementation of a scenario for communication of a charging apparatus with a mobile device, which may support authorisation for a user.

With reference to FIG. 7, there is illustrated an example scenario.

A charging apparatus denoted by reference numeral 71 is associated with a charging apparatus software (which may itself be an app), and as denoted the charging apparatus 71 and the charging apparatus 73 are connected by bi-directional communication lines 77 for illustration, although the charging apparatus software runs, as will be understood, on the charging apparatus or electronic circuitry thereof.

A mobile device denoted by reference numeral 83 is associated with a mobile device app 81, and as denoted the mobile device 83 and the mobile device app 81 are connected by bi-directional communication lines 85 for illustration, although the mobile device app software runs, as will be understood, on the mobile device or electronic circuitry thereof. The mobile device has a screen 87 on which a user interface associated with the app is displayed.

The charging apparatus includes circuitry 75 associated with Bluetooth transmission, and as denoted by reference numeral 79 the charging apparatus software and the mobile device app are able to communicate with each other, using the electronic circuitry including transmission circuitry of the respective apparatus/device, using Bluetooth or other appropriate wireless communication protocols. The communication 79 is established provided the mobile device 83 is within range of the charging apparatus 71, the range being associated with their respective transmitters and receivers.

Once the initial broadcast message is received by a mobile device, a communication session can be established and conducted between the charging apparatus and the app installed on the mobile device.

The charging apparatus can establish the location of the mobile device. The charging apparatus can provide information on its location to the mobile device. A user interface of the mobile device may display to a user a notification that a charging apparatus is within a certain proximity, and/or may display to a user a geographical indication of the distance of the mobile device from the charging apparatus, and/or may provide the user with an indication of directions to the charging apparatus.

The charging apparatus can provide information as to the availability of its charging points (e.g. lockers). This information may indicate how many charging points are available at the charging apparatus. The app may display this information to a user.

Where multiple charging apparatuses are within range of the mobile device, and the mobile device establishes multiple communication sessions with the multiple charging apparatuses, this may be reflected in any geographical indication presented to the user. Where multiple charging apparatuses are identified, the user app may be provided with information from each charging apparatus as to the availability of charging points at each charging apparatus. The app may display this information to a user, so that the user can determine which of multiple charging apparatuses to go to.

An app may communicate with a charging apparatus to identify and 'reserve' a charging point, with or without user interaction. Where user interaction is involved, the user may use the app on their mobile device simply to select a charging point at a charging device, such that as they approach a charging apparatus they already know which charging point (locker location) should be used. Alternatively this may be done automatically: when a mobile device is within a certain distance of a charging apparatus, the charging apparatus and the app communicate to allocate a charging point to the mobile device, and the selected charging point (i.e. locker) is displayed to the user on the user interface of the mobile device.

The charging apparatus and the app may additionally communicate to establish any necessary authentication of the user beyond simply identifying the mobile device, which would be sufficient user authorisation for a public use.

For example, where access to a charging apparatus is reserved for a particular group of users, the communication may establish that the mobile device is associated with that group of users. For example when a charging apparatus is controlled by a retailer, this may require establishing the mobile device is associated with a membership or loyalty scheme for that retailer. Where access to the charging apparatus requires payment, the communication between the charging apparatus and the app may process that payment.

This communication may be further utilised after a charging operation. After a mobile device is removed from a charging point (locker) after charging, the mobile device will still be in range of the charging apparatus associated with the communication discussed above. Thus any app on the mobile device may still communicate with any app or software associated with the charging apparatus (or associated with the retailer or other entity). This communication may be used to communicate a message to the app providing, for a example, an acknowledgment that charging has been carried out and completed, an indication of any automated charging applied, a voucher or token for use with a retailer, etc.

The step of detecting confirmation that a device has been connected comprises detecting the physical connection of the device.

Generally, it is always possible to detect that some kind of device with a physically compatible socket to one of the plugs (34a-34c of FIG. 2) has been connected, because of voltage changes on the connector pins of the charging cable (32a-32c of FIG. 2) detectable by the electronic control circuitry or the computer associated therewith. In its simplest form, this may provide confirmation of connection.

Some devices provide an identification of the device when they are connected for charging. For example devices which use USB connections for charging may use a characteristic of a USB connection to provide an identity.

Enumeration associated with a USB connection allows detection of the type of a device connected on a USB link. Using enumeration, a host computer can retrieve a device identifier. The device identifier may simply identify the type of device—e.g. whether the device is a telephone—or may identify the specific type of device e.g. the type of phone. For example a Blackberry device may provide an enumeration which simply identifies itself as a telephone, whereas an Apple device may identify itself as a particular telephone model.

If a device is turned fully off, or if the battery of the device is completely discharged, then the device will not have any or sufficient power to return any identity information.

Some devices, for example battery chargers, will not identify themselves to the host computer. 70% of devices currently provide an identifier.

In preferred embodiments information identifying a device is not used. However certain implementations may use the information. For example, a charging connection may be free for one type of device but not others. Charging may not be provided for certain types of device, but this may create difficulties where a device cannot identify itself simply because it has a flat battery.

The detection of connection of a device provides an audit trail. This protects against, for example, a user saying they had charged a particular type of telephone and it had been stolen, when in fact they had not. Thus even if an identity of a device is not used to determine charging of a device, it may be used to capture information for audit purposes.

The provision of an audit trail is important as it is important the company providing the charging service is known for a secure service.

The audit information preferably captures all the information available at each charging facility—the type of telephone, the time of charge, the activity of the locker, etc.

The audit trail may be provided to a system overseeing the set of charging lockers using a site Wi-Fi network, a 3G network or an Ethernet connection or other remote communications technology. The audit information may also be stored for a later download. In some payment models the charging facility may need to be on-line to authorise users.

Figure 8:
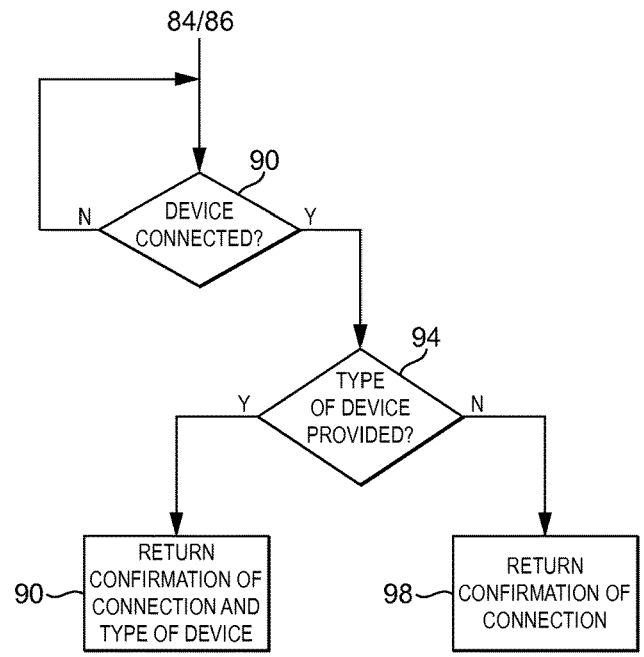
FIG. 8 illustrates an example of a device connection process.

An exemplary implementation of a process for confirming connection of a device according to step 72 of FIG. 5 is illustrated in FIG. 8. Following successful authorisation in step 84 or step 86 of FIG. 6, in step 90 of FIG. 8 it is determined whether a device is connected. If a device is not connected then the process remains in step 90, and may time out after a particular time. If a device is connected then the process moves on to step 94, and the type of device provided is determined. If no type of device is provided then in step 98 the process returns a positive connection, and otherwise in step 90 returns the positive connection in addition to an identification of the device.

The step of detecting whether a device is accepted for charging comprises detecting that a charging connection is provided to the device.

The process involves acceptance of a charging connection. A device might not be chargeable because it is damaged, for example, in which case it is not accepted for charging. This prevents someone from complaining, for example, if they are charged a payment for charging and charging does not take place.

Figure 9:
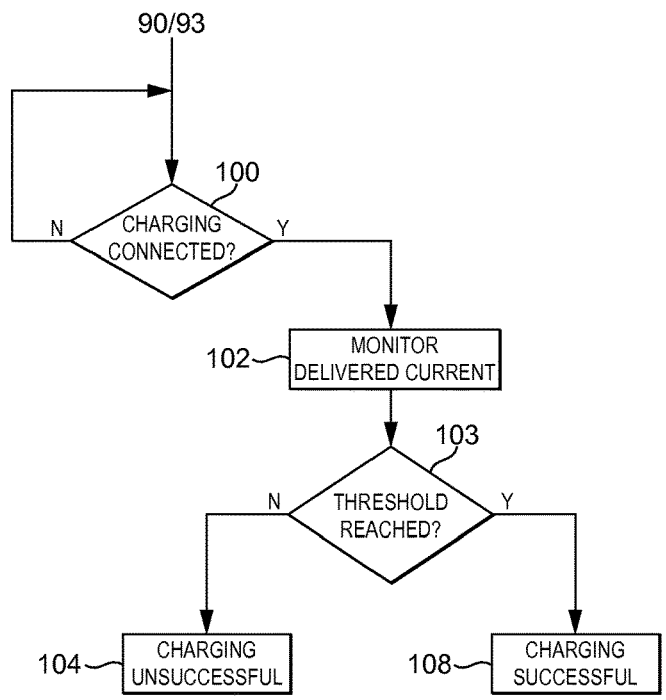
FIG. 9 illustrates an example of a device charging process.

An example process for determining if charging has been accepted is illustrated in FIG. 9.

After steps 90 or 98 in step 100 it is determined if charging has been commenced. If charging has not been commenced then the process remains in step 100, and may time out after a particular time period. If charging has been commenced then the process moves on to step 102.

In step 102 the current delivered is monitored many times a second and the total current delivered accumulated over time is calculated to see if a preset threshold value has been reached. If in step 103 it has not been reached, the monitoring and calculation of accumulated charging current delivered continues until either the threshold is reached or a long-stop timeout time is reached and it is concluded that the current draw is at too low a level to be considered successful charging.

In a preferred implementation, what is actually measured is current delivered over time. For example, the threshold may be set at 500 mA seconds, so the device could take a charge of 500 mA for one second and reach the threshold, or a current of 1 Amp for ½ second or 200 mA for 2.5 seconds etc. There may also be a timeout, for example of 5 seconds, beyond which the computer or control electronics decides the device is never going to charge properly.

If a failure is detected in step 103 then in step 104 a message is provided that charging has failed.

If a successful charging is detected in step 103 then in a step 108 a message is provided that charging has been successful.

For the authentication process to be successful, the user authorisation, the confirmation of connection, and the confirmation that charging has been accepted must all preferably be successful before operation can continue.

Figure 10:
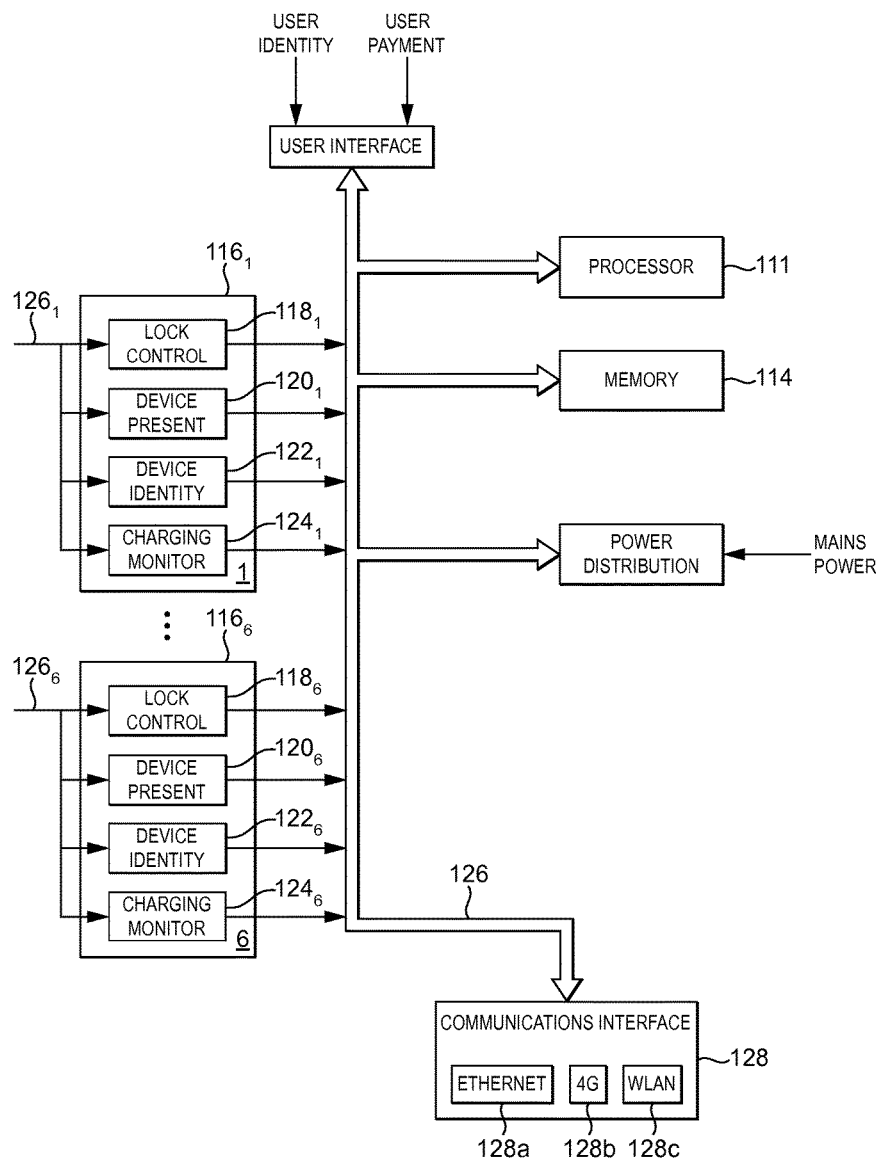
FIG. 10 illustrates an example schematic of processor circuitry for implementing the described authentication process.

With reference to FIG. 10 there is illustrated an example schematic of the electronic circuitry required to implement the authentication process as described.

The circuitry includes a user interface 110, a processor 112, a memory 114, and a plurality of locker control blocks $116_1$ to $116_6$, in an example where six local facilities are provided. Each locker control block includes four functional circuits, including a lock control unit $118_1$ to $118_6$, a device present control unit $120_1$ to $120_6$, a device identifier unit $122_1$ to $122_6$, and a charging monitor unit $124_1$ to $124_6$.

Each locker control block receives a signal on line $126_1$ to $126_6$ providing electronic information from the associated locker. In practice this is information on a number of signal lines, including information concerning the device connected to the charging wire and information associated with the electronics of the locking mechanism. As each locker device preferably provides several wires for charging, the input to each locker control unit $116_1$ to $116_6$ on lines $126_1$ to $126_6$ may include a corresponding plurality of connections.

The architecture of FIG. 10 includes a communication bus 126 which connects the user interface 110, the processor 112, the memory 114, and each of the locker control blocks $116_1$ to $116_6$.

As illustrated in FIG. 10 there is also provided a communications block 128, which provides the communications as necessary for the electronic circuitry. This may be an Ethernet connection interface 128a, a wireless interface 128b (such as 3G), or a local area network wireless interface or other remote communications interface (such as 4G denoted by 128b).

The authentication process prevents a user from placing a device in a locker other than the locker which is chosen, since the process is dependent upon inputs from an individual locker. The authentication process means that the presence of the device is required for the locker to lock.

A part of the user experience is that the user can see that charging is underway because it continues after a successful charging test, before a user closes the door.

Once the authentication process is complete charging takes place for a particular service time period, such as 30 minutes, provided the locker door is locked. The charging of the device may be stopped if the locker is not locked at the end of short countdown time period of for example 30 seconds.

Because some users like to double check that their device is charging there may be a grace period when the locker door can be re-opened briefly, and the countdown time period begins again, before it must be re-locked. Otherwise, opening the locker door during the charging service period results in the charging current being stopped. This ensures that the user always leaves their device securely locked while it is charging. The apparatus is designed to be used in this secure way and it prevents users from standing at an open locker door trying to charge their phone while they wait.

Once the three-step authentication process is complete, the door of a locker can be locked.

The authentication technique described is agnostic in respect of the type of lock. The lock may be an electronic lock or a manual lock for example. Any suitable lock may be used with the authentication technique.

A particular locking mechanism which may be used in combination with the described authentication process is described. This locking mechanism is electro-mechanical.

The host computer preferably communicates with the lock to tell the lock when the authentication process is complete as described above.

An electronic circuitry then determines whether the lock is closed. When the door is fully closed this is detected. An electrical signal provides confirmation that the lock is turned 90°.

In a preferred implementation the locking of the locker is confirmed only once the actual lock is closed, and the mechanism prevents an indication that a lock is closed when it is not by slight movement, for example, of the locking mechanism.

The use of a mechanical lock having a key means that the lock mechanism is not vulnerable to electrical failure.

An important aspect of the preferable locking mechanism is that the charging facility confirms that a locker is properly locked only when it is properly locked, and that the charging facility is able to identify the specific locker which has been locked, and reconcile that with an authentication process having been completed for that particular locker. A preferable example of a locking mechanism is now described.

Figure 11A:
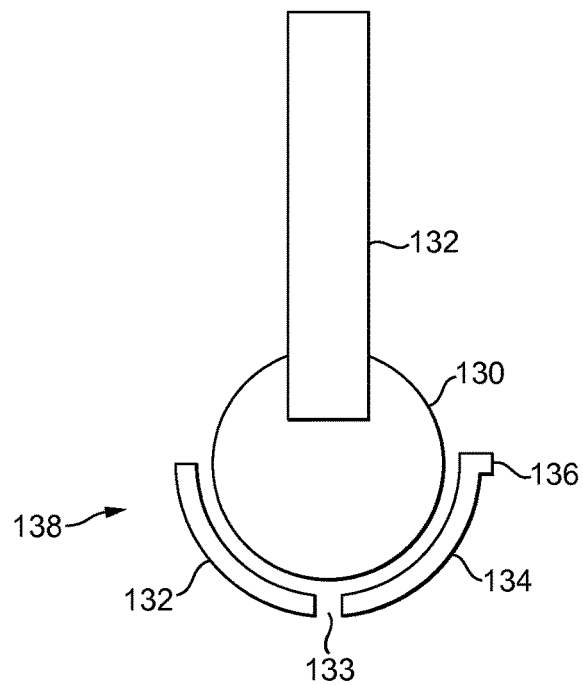
FIGS. 11A and 11B illustrate an example locking mechanism and the operation of such a locking mechanism.
Figure 11B:
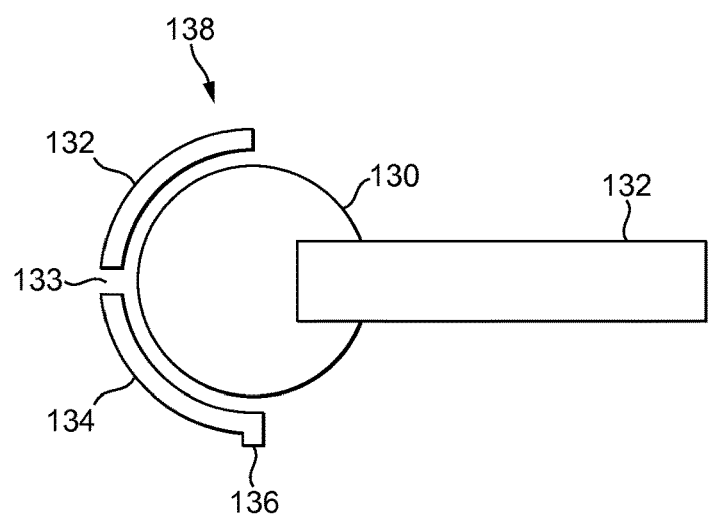

With reference to FIGS. 11A and 11B, there is shown a locking apparatus comprising a circular mechanism 130 and an elongated rectangular mechanism 132 attached to the circular mechanism 130. In FIG. 11A the rectangular means extends vertically, and in FIG. 11B the rectangular means 132 extends horizontally. Between the configuration of FIG. 12A and FIG. 12B the circular means 130 is rotated through 90° turning the rectangular means 132 through 90°. A key may be used to achieve this turning mechanism, although the key is not shown in FIGS. 11A and 11B.

In the arrangement of FIGS. 11A and 11B the circular means 130 is provided with a mechanism 138, which turns as the circular means 130 turns. The mechanism 138 includes a first part 132, a second part 134, and a third part 136. An opening 133 is provided between the part 132 and the part 134.

As can be seen between FIGS. 11A and 11B, as the circular means 130 turns the mechanism 138 similarly turns. Thus the part 136, which protrudes from the part 134, changes from a first position to a second position, and the opening 133 changes from a first position to a second position. In the arrangement of FIG. 11A the protrusion 136 is located at "3 O'clock", and the opening 133 is located at "6 O'clock". After turning of the circular mechanism 130 to extend the rectangular means 132 in a horizontal direction, the protrusion 136 is located at the "6 O'clock" position and the opening 133 is rotated to be positioned at the "9 O'clock" position.

The arrangement of FIGS. 11A and 11B illustrates the general principles of a locking mechanism in accordance with this preferred embodiment. To further illustrate the locking mechanism provided by the rectangular means 132 reference can be further made to FIGS. 12A and 12B.

Figure 12A:
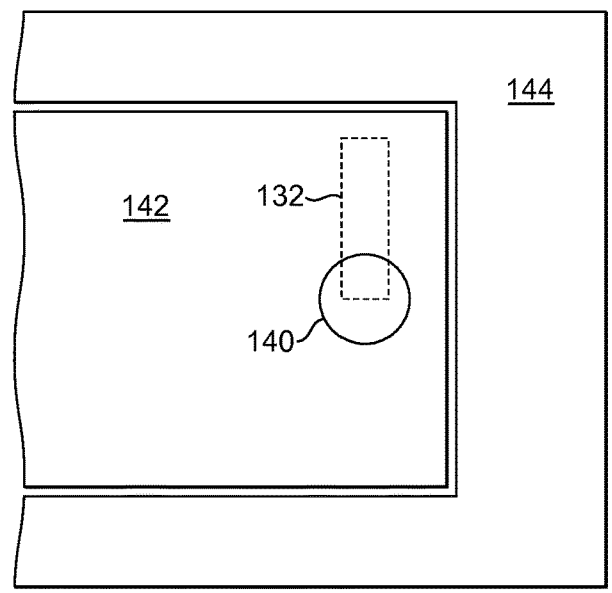
FIGS. 12A and 12B illustrate an example locking mechanism in the context of its application to a locker.
Figure 12B:
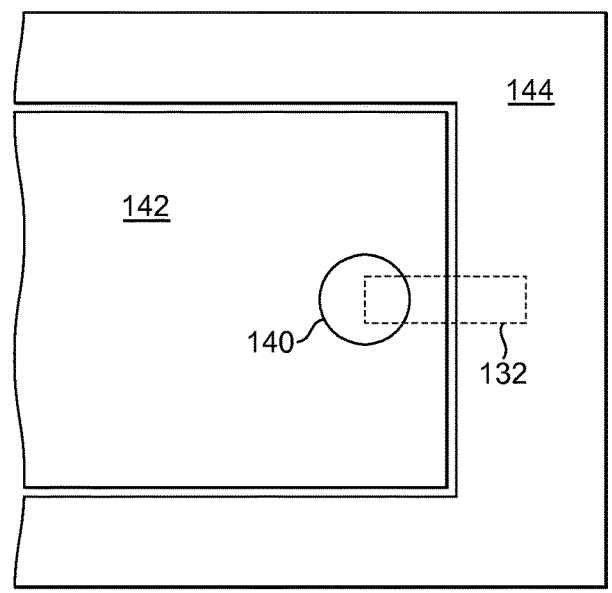

FIGS. 12A and 12B illustrate the rectangular means 132, and in addition a circular means 140 which is presented on the outside of a locker door 142. The circular means 140 is different to the circular means 130 in FIGS. 11A and 11B, and illustrates the locking mechanism which is visible to a user and in which a key may be inserted. On turning of the locking mechanism 140 of FIG. 12a through 90°, the rectangular protrusion 132 moves from a vertically orientated position as shown in FIG. 12A to a horizontally orientated position as shown in FIG. 12B. This is consistent with the operations and positioning shown in FIGS. 10A and 10B.

As also illustrated in FIGS. 12A and 12B, in addition to the locker door 142 there is provided an outer arrangement 144 against which a locking mechanism can abut. In the arrangement of FIG. 12A the locker door is openable, and the lock is unlocked, such that the locker door 142 may be opened relative to the surface 144. In the arrangement of FIG. 12B the locker door is locked, and the lock is closed, such that the locker door 142 may not be opened relative to the surface 144, as the rectangular protrusion 132 will abut the inner surface of the apparatus 144.

Equally, it is possible to position the locking mechanism in the fixed part 144 and for the rotating part 132 to rotate in to a slot in the openable part 142. The purpose is that there is provided a moveable part (e.g. a door) and a fixed part (e.g. a housing), and the locking mechanism is provided to allow the door to open when the lock is open, and the door to close when the lock is closed. The installation of the locking mechanism relative to the fixed part and the moveable part is not important, and the lock/lock receptacle may be located on either.

Thus in one example the locker door 142 is simply provided with a slot for receiving the rectangular means 132 of a locking mechanism installed in the adjacent housing (e.g. reference numeral 144 in FIGS. 12A and 12B).

Figure 13A:
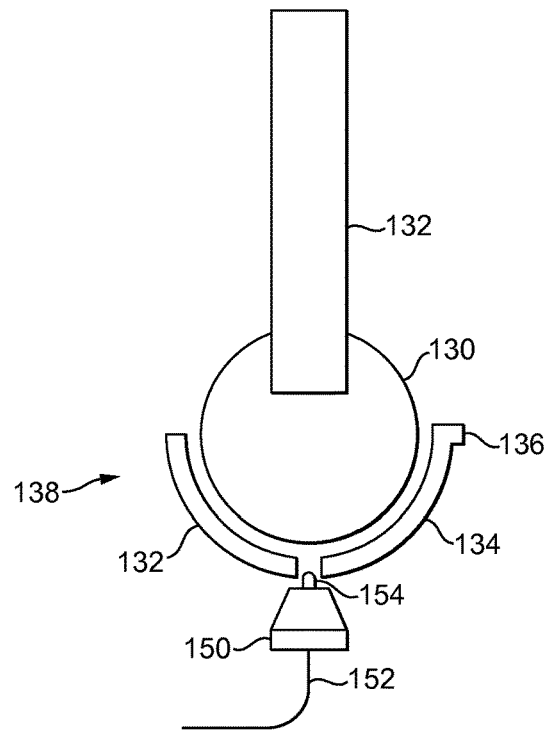
FIGS. 13A and 13B illustrate an example locking mechanism including the generation of an electronic processing signal.
Figure 13B:
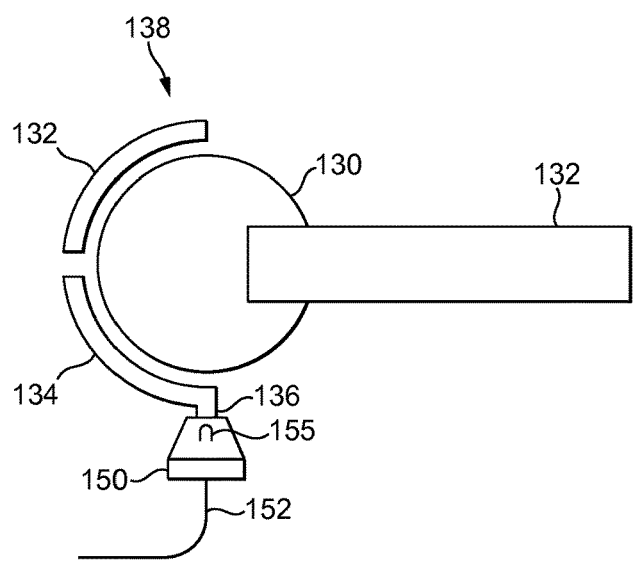

With reference to FIGS. 13A and 13B, there is now illustrated how the mechanical arrangement 138 of FIGS. 10A and 10B may be used to provide confirmation of the locking of a locker in accordance with a preferred embodiment of the present invention. FIGS. 12A and 12B are provided solely for illustrating the locking operation, and showing a locker in an open and closed position.

As illustrated in FIGS. 13A and 13B, there is further provided an electrical apparatus 150 having an electrical connection 152, and a protruding resilient means 154. This mechanism is located at the "6 O'clock position", such that in the arrangement of FIG. 11A the resilient means 154 protrudes into the space 133, as illustrated in FIG. 13A. The electrical apparatus further includes an optical sensor 155.

The electrical apparatus 50, as discussed, preferably comprises a resilient means 154 and an optical sensor 155. The electrical apparatus further preferably comprises a solenoid.

The optical sensor detects when the protrusion 136 is in front of it (at the 6 o'clock position), indicating that the lock is properly closed.

The solenoid is activated by an electric current. When activated it draws back the resilient means 154 into the body of the electrical apparatus 150, thus releasing the hole 133 and allowing the lock to turn. The solenoid is activated when the authentication process has completed successfully.

The user turns the lock through 90°, and the protrusion cuts the light beam on the optical sensor which signals to the computer or electrical control circuitry that the lock has been locked and the current to the solenoid 150 is then cut off.

The resilient part tries to move back under the pressure of a spring built in to the solenoid body. It cannot move very far because the rotating part is in the way (and the hole 133 is now round at 9 o'clock) so it just rests against 136 held by the pressure of the spring.

When the locking mechanism is closed, the space 133 moves to the "9 O'clock position", and the protrusion 136 moves to the "6 O'clock position" which the space 133 previously occupied. The electrical means 150 does not move.

The electrical signal carried on the electrical connection 152 represents the displacement of the resilient means 154 and the cutting of the light beam on the optical sensor.

In the arrangement of FIG. 13A the electrical signal on line 152 indicates that the lock is open, as the protrusion 154 is extended into the space 133.

In the arrangement of FIG. 13B the electrical signal on line 152 illustrates that the lock is closed, as the resilient member 154 has been retracted into the electronic means 150 and the light beam has been cut.

It will be apparent from the foregoing that this is only achieved once the circular means 130 has been moved from 90°, and is not achieved by a small movement of the circular means 130.

Thus there is provided an arrangement in which the lock is prevented from being turned until the authentication process has completed successfully. The lock mechanism is then released, and then when the lock has been turned a signal is provided to the electronic control means which clearly indicates that the locker has been locked, and cannot give a false indication that the locking mechanism has only been slightly turned.

The apparatus is preferably a charging station having a plurality of secure charging areas as illustrated. Each secure charging area preferably has a plurality of cables each having different connectors for providing a charge for different devices. In such an arrangement it is necessary for power to be delivered to multiple secure charging areas, and to multiple cables within those charging areas.

The cable/connector combination in each secure area will correspond to the electronic devices which needs to be supported for charging.

Figure 14:
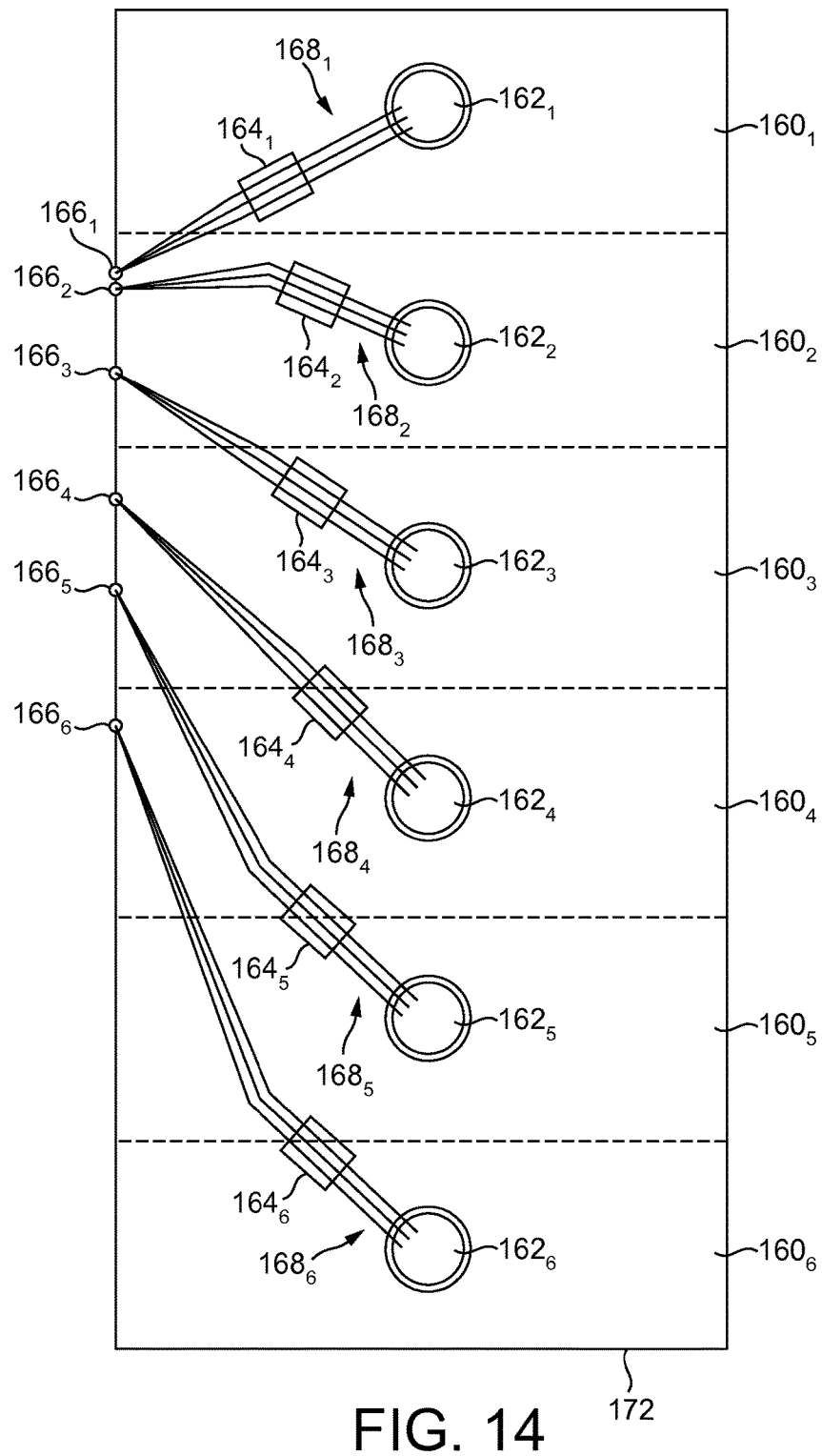
FIG. 14 illustrates the distribution of charging cables at the rear of a locker apparatus.

FIG. 14 illustrates the rear of the locker set 24 of the FIG. 1 arrangement, illustrating the connection of charging cables to each locker. Thus the arrangement of FIG. 14 shows the rear panel of six charging lockers denoted by reference numerals $160_1$ to $160_6$. Each rear panel includes an opening $162_1$ to $162_6$ which is illustrated in the embodiments as a circular opening. The charging cables for each locker go into the opening, and the connection into the opening is not shown in this Figure as it is not relevant. In the example described each locker receives three electrical cables, denoted by the provision of electrical cables $168_1$ to $168_6$, each reference numeral denoting three separate cables.

As illustrated in FIG. 14, in this embodiment the cables are received from electronic circuitry at connector points $166_1$ to $166_6$. At these points the cables still comprise three distinct and separate cables, but they are shown as combined together in FIG. 14 as they pass through a connector at this point. This is a mechanical connector and not an electrical connector.

As additionally shown in FIG. 14, each of the three electric cables for each charging locker pass through an additional connector denoted by reference numerals $164_1$ to $164_6$. This again is a mechanical and not an electrical connector.

Figure 15:
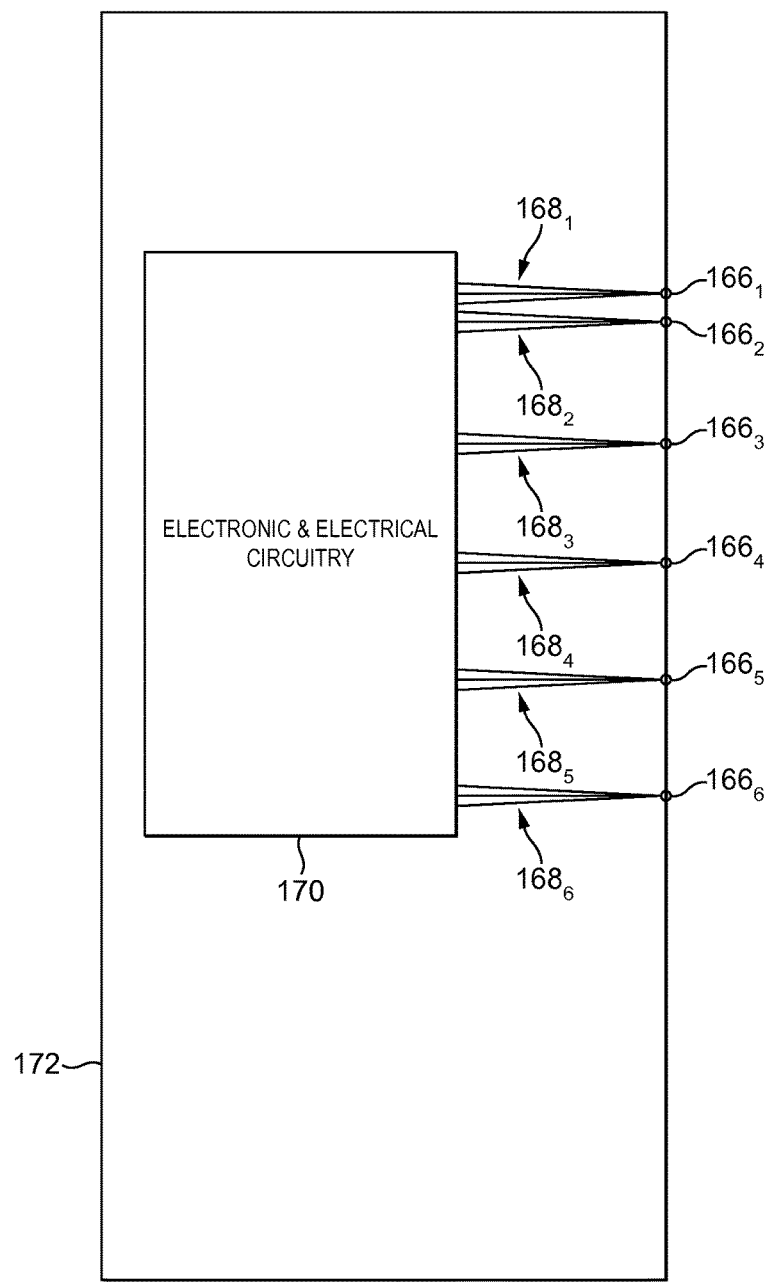
FIG. 15 illustrates the distribution of charging cables at the side of a locker apparatus.

For illustration FIG. 15 illustrates the side connection of the module of FIG. 14, showing the mechanical connectors $166_1$ to $166_6$, which the charging cables $168_1$ to $168_6$ pass through on their way to connection to the electronic and electrical circuitry 170. The electronic and electrical circuitry 170 forms part of the unit 172. The implementation of the electronic and electrical circuitry 170 is not relevant to this discussion.

Figure 16:
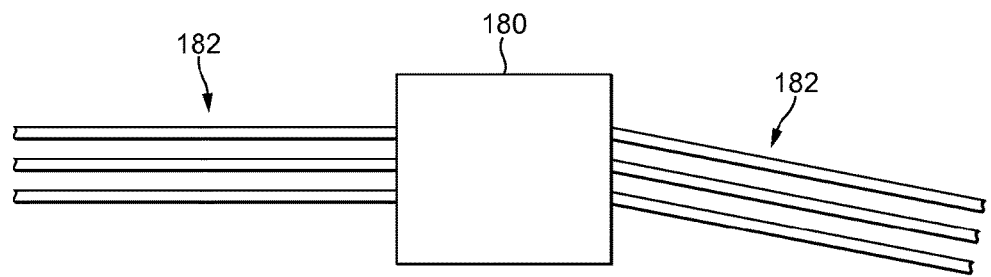
FIG. 16 illustrates a mechanical connector element for changing the direction of charging cables.

FIG. 16 illustrates the preferable implementation of the mechanical connectors $166_1$ to $166_6$ of FIGS. 14 and 15. Reference numeral 180 denotes a mechanical connector corresponding to the connectors $166_1$ to $166_6$. Reference numeral 182 denotes the three electrical wires providing charging capability to a locker, corresponding to one of the electrical wire arrangements $168_1$ to $168_6$ of FIGS. 14 and 15.

The purpose of a mechanical block connector 180 is to control the direction of the electrical cables, such that they are "turned" in the direction in which it is desired. Thus for the arrangement of FIGS. 14 and 15 the mechanical connectors $166_1$ to $166_6$ are intended to direct the cables towards the openings $162_1$ to $162_6$. This may be achieved by positioning of the electrical connectors $166_1$ to $166_6$, or by the mechanical nature of the connectors $166_1$ to $166_6$.

Thus in the arrangement of FIG. 16, it is shown that the connector 180 is positioned or has the functionality to change the mechanical direction of the cables 182. Such connectors can be used to direct the cables to desired positions.

In use, users of the lockers for charging devices will tend to pull the electrical cables provided therein to connect them to the electronic devices. Over time the pulling of such cables will cause the mechanical and electrical integrity of the charging cables to deteriorate. Thus in a preferred embodiment a mechanism is provided in order to remedy this.

Figure 17A:
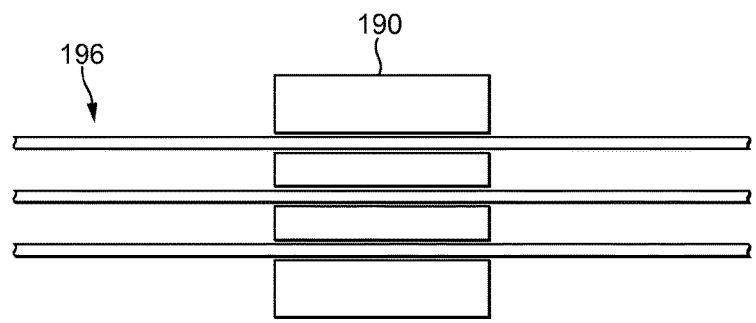
FIGS. 17A and 17B illustrate an example mechanical connecting apparatus for preventing movement of charging cables in one direction and not preventing movement of charging cables in a different direction.
Figure 17B:

Each of the connectors $164_1$ to $164_6$ are implemented as shown in FIG. 17A as a connector 190. The three electrical wires passing through such connector are illustrated in FIG. 17A as lines 196. A side profile of the mechanical connector 190 is shown in FIG. 17B.

The purpose of the mechanical connector block 190 is to prevent lateral movement of the electrical cables, but allow movement perpendicular to the lateral direction. Thus the wires may be lifted out of the connector 190 for maintenance (for example), but may not be pulled longitudinally by a user who pulls the wire within the locker.

Referring to FIG. 17A, motion from left to right (or right to left) in the plane of the page is prevented, while motion perpendicular to the plane of the page is permitted. In a preferred embodiment lateral movement is permitted in only one direction rather than both.

The connector 190 thus provides this functionality, to prevent a pulling movement of the electrical cables by a user, but to allow the electrical cables to be disengaged from the connector 190 easily during a maintenance process.

Figure 18:
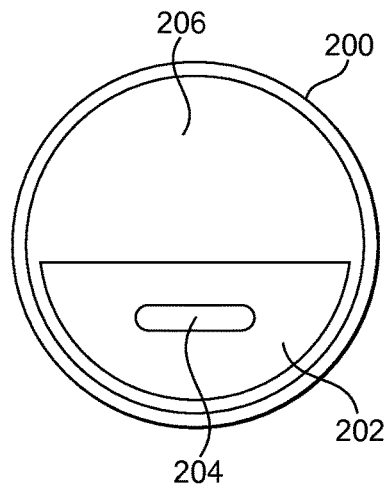
FIG. 18 illustrates an example connector for feeding charging cables into a locker area.

FIG. 18 illustrates an exemplary implementation of the connection of the electrical cable set $168_1$ to $168_6$ of FIG. 14 into the locker area.

Each circular opening 206 is provided with a protective rim 200. A mechanism 202 may be inserted into the protective rim 200, having an opening 204. The opening 204 allows for the charging cables to be provided therethrough into the locker mechanism. Preferably the means 202 provided within the opening 206 may be secured in use, and easily removable for maintenance purposes.

Each cable within a secure area has a connector for charging a particular electronic device. Preferably each cable/connector combination is fitted with a cable moulding which aids insertion/removal, increases life, and identifies the orientation of the connection. Colour coding may be used on the moulding the help identify the cable/connector type.

Figure 19:
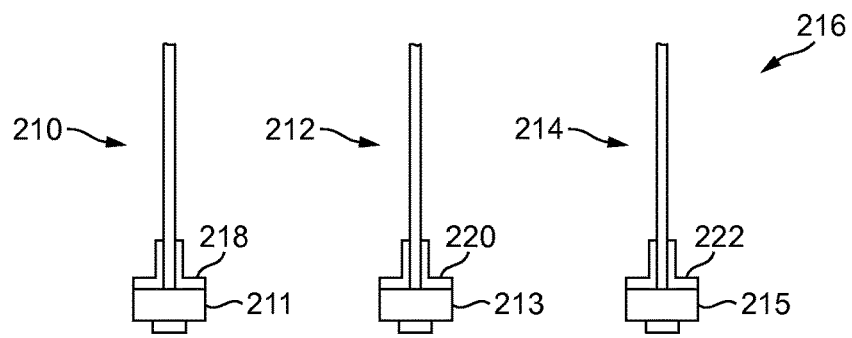
FIG. 19 illustrates mouldings for charging cables in an example.

With reference to FIG. 19, there is illustrated by reference numeral 216 three exemplary charging cables which may be provided in a locker. These cables are denoted by reference numerals 210, 212 and 214. Each of the charging cables is provided with a connector denoted by reference numerals 211, 213 and 215. Each of the connectors is different, to allow charging of a different electrical device. In accordance with the preferred embodiment, each of the cables is provided with an additional identifier 218, 220, or 222 respectively. This identifier may secure the cable to the connector, and may additionally identify the cable by being provided in a particular colour (for example). The connectors 218, 220, 222 may provide a secure mechanical means for securing the cable to the connector for persistent use, and also provide a means for more conveniently connecting the cable to a device to be charged.

Figure 20:
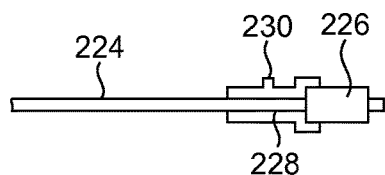
FIG. 20 illustrates a side perspective of an example moulded charging cable.

FIG. 20 illustrates a sideways view of one of the charging cables illustrated by reference numeral 224 and an associated connector 226. An additional connector 228 is provided in accordance with the connectors of FIG. 19. As illustrated in the drawing of FIG. 20 this connector 228 may be provided with a protrusion 230, which illustrates the orientation in which the connector should be connected to an electrical device. The protrusion may be provided on the upper side of the cable, such that this can be understood to be the side of the connector which should be connected to the device orientated with its user interface as the upper side.

In a particular implementation where multiple electrical cables are provided, each cable may be provided with a connector such as connectors 218, 220 and 222 which are of a different colour to indicate the type of connector, and the indication of the colours associated with different connectors may be provided external to the locker in a position which is visible to a user.

The invention has been described herein with application to particular embodiments and particular uses. Embodiments described herein may be provided in combination or may be provided separately. No example given herein need be combined with another example given herein unless it is specifically stated in this description. One or more examples may be provided in any given implementation. Although the invention is described in a particular implementation to a charging arrangement comprising six lockers for charging portable electronic devices including mobile phones, the invention is not limited to the provision of six charging points, or to the charging of mobile phones or mobile electronic devices.

The invention claim is:

1. An apparatus for authenticating an initiation of a charging process for a secure charging apparatus, the apparatus comprising:
   circuitry configured to authorize a user;
   circuitry configured to confirm connection of a device;

circuitry configured to determine if initial provision of a charging current to the device has commenced and been accepted, thereby confirming charging of the device is possible;

a locking mechanism configured to secure the device in the apparatus; and circuitry configured to control the locking mechanism, wherein the circuitry configured to control the locking mechanism is configured to enable the locking mechanism only if:

(i) the user authorization is successful;

(ii) the confirmation of the connection is successful; and (iii) the determination that the initial provision of the charging current to the device has commenced and been accepted is successful, and wherein the charging process can continue only if the locking mechanism is enabled.

2. The apparatus of claim 1 wherein the circuitry configured to authorize the user comprises circuitry configured to identify the device.

3. The apparatus of claim 1 wherein the circuitry configured to authorize the user further comprises circuitry configured to compare the user to a list of authorized users.

4. The apparatus of claim 1 wherein the circuitry configured to authorize the user comprises circuitry configured to determine payment associated with the user.

5. The apparatus of claim 1 wherein the circuitry configured to authorize a user comprises circuitry configured to provide a confirmation of a user authorization.

6. The apparatus of claim 1 wherein the circuitry configured to authorize the user comprises circuitry configured to establish a short-range communications session with the device.

7. The apparatus of claim 1 wherein the circuitry configured to confirm connection of the device comprises circuitry configured to detect connection of the device to a charging cable.

8. The apparatus of claim 7 wherein the circuitry configured to detect connection of the device comprises circuitry configured to retrieve an identification of the device on the charging cable.

9. The apparatus of claim 1 wherein the circuitry configured to determine if initial charging of the device has commenced comprises circuitry configured to determine that a connected device is being charged for a given accumulated total current delivered over time up to a time limit.

10. The apparatus of claim 1 wherein the secure charging apparatus comprises a plurality of secure charging positions, wherein the circuitry configured to enable a locking mechanism is enabled for the secure charging position for which the connection of the device and the charging of the device are confirmed.

11. The apparatus of claim 10 further comprising circuitry configured to enable the user to select the secure charging position before the initiation process.

12. The apparatus of claim 1 further comprising circuitry configured to establish a short-range communications session with the user device.

13. A method for authenticating the initiation of a charging process for a secure charging apparatus, the authentication method comprising the steps of:

(i) authorizing a user;

(ii) confirming connection of a device;

(iii) determining if initial provision of a charging current to the device has commenced and been accepted, thereby confirming charging of the device is possible; and (iv) controlling a locking mechanism configured to secure the device in the apparatus, wherein the locking mechanism is enabled only if the steps (i), (ii), and (iii) are all successful, and wherein the charging process can continue only if the locking mechanism is enabled.

14. The method of claim 13, further comprising establishing a short-range communication session with the device.

15. The method of claim 14 wherein an app of the device communicates with software of the apparatus during the short-range communication session.

16. The method of claim 15 wherein the short range communication session is used to authorize the user.

17. The method of claim 16 wherein the short range communication session is used to notify the user, via the app, of the availability of charging points at the apparatus.

18. The method of claim 15 wherein the short range communication session is used to notify the user, via the app, of the location of the charging apparatus.

19. The method of claim 15 wherein on completion of the charging process, the short range communication session is used to display messages to the user via the app.

* * * * *